United States Patent
Thomson et al.

(10) Patent No.: US 12,281,689 B2
(45) Date of Patent: Apr. 22, 2025

(54) MOUNTING DEVICE FOR AN ELONGATE MEMBER

(71) Applicant: FIRST SUBSEA LIMITED, Lancaster (GB)

(72) Inventors: Craig Richard Thomson, Lancaster (GB); Anthony John Little, Lancaster (GB); Stephen Bennett, Lancaster (GB); Daniel Mark Giddings, Lancaster (GB)

(73) Assignee: FIRST SUBSEA LIMITED, Lancaster (GB)

( * ) Notice: Subject to any disclaimer, the term of this patent is extended or adjusted under 35 U.S.C. 154(b) by 351 days.

(21) Appl. No.: 17/770,995

(22) PCT Filed: Sep. 8, 2020

(86) PCT No.: PCT/GB2020/052155
§ 371 (c)(1),
(2) Date: Apr. 21, 2022

(87) PCT Pub. No.: WO2021/079082
PCT Pub. Date: Apr. 29, 2021

(65) Prior Publication Data
US 2023/0349444 A1  Nov. 2, 2023

(30) Foreign Application Priority Data
Oct. 21, 2019 (GB) ..................... 1915199

(51) Int. Cl.
*F16B 7/02* (2006.01)
*F16G 11/10* (2006.01)
(52) U.S. Cl.
CPC ................. *F16G 11/108* (2013.01)

(58) Field of Classification Search
CPC ...... F16B 2/16; F16B 7/02; F16B 7/14; B63B 21/50; E21B 41/10; F16G 11/108
See application file for complete search history.

(56) References Cited

U.S. PATENT DOCUMENTS 6,305,649 B1    10/2001  Walmsley
2019/0309824 A1*  10/2019  Jackson ............. F16G 11/108

FOREIGN PATENT DOCUMENTS

GB    2146091 A    4/1985
GB    2155577 A    9/1985
(Continued)

OTHER PUBLICATIONS

Examination Report under Section 18(3) for GB Application No. GB191519912, dated Jan. 17, 2023, 2 pages.
(Continued)

*Primary Examiner* — Daniel J Wiley
(74) *Attorney, Agent, or Firm* — Womble Bond Dickinson (US) LLP (57) ABSTRACT

A mounting device for an elongate member, comprising: an elongate housing having an elongate axis; an internal passageway passing through the elongate housing parallel to the elongate axis; an elongate sleeve located within the internal passageway and being configured for longitudinal movement along the passageway; a plurality of ball-receiving recesses in the wall of the internal passageway, each recess having a ball-guiding surface inclined to the longitudinal axis; a plurality of apertures in the sleeve; a ball located in each of the ball-receiving recesses and engaged with a respective aperture in the sleeve, the balls and the apertures being configured to allow the balls to project partially through the apertures but to prevent balls from passing through; biasing means configured to bias the sleeve in a direction to urge the balls to project radially inwardly (Continued)

through their respective apertures in the sleeve and into the internal passageway.

17 Claims, 6 Drawing Sheets

(56) References Cited

FOREIGN PATENT DOCUMENTS

| | | |
|---|---|---|
| GB | 2534595 A | 8/2016 |
| GB | 2551716 A | 1/2018 |
| WO | 2019158905 A1 | 8/2019 |

OTHER PUBLICATIONS

Intention to Grant under Section 18(4) for GB Application No. GB1915199.2, dated Jan. 17, 2024, 2 pages.
Search Report under Section 17 for GB Application No. GB1915199.2, dated Mar. 23, 2020, 2 pages.
International Search Report from PCT International Application No. PCT/GB2020/052155, mailed Nov. 27, 2020, 3 pages.
Written Opinion of the International Searching Authority from PCT International Application No. PCT/GB2020/052155, mailed Nov. 27, 2020, 6 pages.
Letter from WP Thompson to European Patent Office regarding PCT Patent Application No. PCT/GB2020/052155, dated Dec. 14, 2020, 9 pages.
International Preliminary Examination Report on Patentability for PCT Patent Application No. PCT/GB2020/052155, mailed Jan. 14, 2021, 14 pages.

\* cited by examiner

MOUNTING DEVICE FOR AN ELONGATE MEMBER

CROSS REFERENCE TO RELATED APPLICATIONS

This patent application is a US National Phase Application under 35 USC 371 of International Patent Application No. PCT/GB2020/052155, filed Sep. 8, 2020, which claims priority to United Kingdom patent application no. 1915199.2 GB, filed Oct. 21, 2019.

The present invention relates to mounting devices for an elongate member and particular, but not exclusively, to a mounting device for a pull head connector.

In offshore energy applications, it is often necessary to secure a mooring line to an offshore installation. This can be achieved by attaching a mandrel to one end of the line, the mandrel having an aperture passing radially through it. The mandrel can be drawn into complementarity-shaped aperture passing through a housing, and the mandrel can be secured in position in the housing by means of a pin which engages with the aperture in the mandrel.

However, in order to secure the mandrel in position, it is necessary to align the aperture in the mandrel accurately with respect to the pin, which can be very difficult in subsea environments where the mandrel and the housing are likely to be in constant relative motion unless and until secured to one another.

Prior art document GB 2 534 595 A discloses an apparatus for anchoring a buoyant assembly to a submerged anchorage comprises a receptacle adapted for mounting to the buoyant assembly, an elongate member passable through the receptacle between first and second sides of the receptacle and a mooring line attached to the elongate member. The elongate member is passable through the receptacle in first and second opposing axial directions and the mooring line is connectable to the submerged anchorage. The receptacle is operable in a first mode, in which the receptacle inhibits passage of the elongate member through the receptacle in at least one of the axial directions, and a second mode, in which the receptacle permits passage of the elongate member through the receptacle in both axial directions. The apparatus may improve the ease and/or the cost efficiency of anchoring a buoyant assembly when compared to conventional apparatus.

Prior art document GB 2 551 716 A discloses a mooring connector adapted for release under load from a complementary connector. The connector comprises: at least one locking element for engagement with the complementary connector to lock the complementary connector to the connector; and a locking member moveable from a fully locked position to a fully unlocked position. The locking member is operative to permit the, or each locking element to lock the complementary connector to the connector when in the fully locked position and is operative to allow the, or each locking element to release the complementary connector from the connector when in the fully unlocked position. The locking member and locking element are arranged such that when the connector is locked to the complementary connector and the locking member is in a partially unlocked position, a load applied to the or each locking element caused by a load urging the connector and the complementary connector apart causes the or each locking element to urge the locking member towards its fully unlocked position, thereby unlocking the complementary connector from the connector.

Prior art document WO 2019/158905 A1 discloses a mooring system for a floating structure, the mooring system comprising: a first tensioning means adapted for connecting the floating structure to a line; and a second tensioning means adapted for disposal on or along the line. The second tensioning means is adapted to apply a tension to the line, e.g. to coarsely position the floating structure, while the first tensioning means is adapted to adjust the applied tension to or on the line. The second tensioning means comprise a mid-line tensioner.

In accordance with the present invention, a mounting device for an elongate member, comprises:
an elongate housing having an elongate axis;
an internal passageway passing through the elongate housing parallel to the elongate axis;
an elongate sleeve located within the internal passageway and being configured for longitudinal movement along the passageway;
a plurality of ball-receiving recesses in the wall of the internal passageway, each recess having a ball-guiding surface inclined to the longitudinal axis;
a plurality of apertures in the sleeve;
a ball located in each of the ball-receiving recesses and engaged with a respective aperture in the sleeve, the balls and the apertures being configured to allow the balls to project partially through the apertures but to prevent balls from passing through;
biasing means configured to bias the sleeve in a direction to urge the balls to project radially inwardly through their respective apertures in the sleeve and into the internal passageway.

The mounting device of the present invention allows a mandrel to be drawn into the housing, and by providing one or more peripheral recesses or grooves on the mandrel, the balls can be engaged with the recesses or grooves to secure the mandrel to the housing, without the need for accurate alignment. This greatly facilitates the securing of a mooring line, particularly in offshore energy applications.

There may be a plurality of longitudinally-spaced rows of ball-receiving recesses, each recess having a ball-guiding surface inclined to the longitudinal axis and a ball located in each of the ball-receiving recesses, and wherein the sleeve comprises a plurality of longitudinally-spaced rows of ball-receiving apertures corresponding to the balls.

The mounting device preferably comprises spring means configured to bias the sleeve in a direction to urge the balls to project radially inwardly through their respective apertures in the sleeve.

The mounting device preferably comprises means for displacing the elongate sleeve longitudinally along the passageway in a direction opposed to the biasing means.

The sleeve may be connected to a portion which is displaceable from the exterior of the housing.

The mounting device may comprise a portion mounted on the exterior of the housing and connected to the sleeve, for example an external sleeve displaceable the mounted on the exterior of the housing and connected to the elongate sleeve located within the internal passageway.

The mounting device may comprise one or more mounting points at an end of the housing, for example flanges.

In one embodiment, the housing comprises an outer sleeve portion through which the internal passageway passes, the movable elongate sleeve being slidably mounted within the outer sleeve.

The mounting device may comprise guide means for guiding a mandrel into the internal passageway, for example a bell mouth at one end of the elongate housing.

The guide means is preferably connected to, and moves with, the elongate sleeve.

The present invention also includes a mounting assembly comprising a mounting device in accordance with the present invention and further comprising a mandrel, the mandrel having a peripheral recess configured to receive a plurality of balls of the mounting device.

Preferably, the mandrel has a plurality of peripheral recesses configured to receive a plurality of balls of the mounting device.

Preferably, the number of peripheral recesses in the mandrel corresponds to the number of rows of balls of the mounting device.

Preferably, the mandrel comprises a radially projecting portion configured to abut a portion of the elongate sleeve when the balls are located in the peripheral recess or recesses of the mandrel.

This allows the mandrel to be pulled through the elongate sleeve without the balls engaging firmly in the peripheral recess or recesses of the mandrel. However, once the radially projecting portion of the mandrel abuts the elongate sleeve, the balls are received in the peripheral recess or recesses of the mandrel, which secures the mandrel to the elongate sleeve.

The radially projecting portion of the mandrel may comprise a shoulder, for example a shoulder which extends circumferentially around the mandrel.

Preferably, the ball-receiving recesses comprise a rounded portion at one end configured to receive a respective one of the balls.

Preferably, the rounded portions of the recesses are complementarily shaped and sized with the respective balls.

By way of example only, a specific embodiment of the present invention will now be described with reference to the accompanying drawings, in which.

Figure 1:
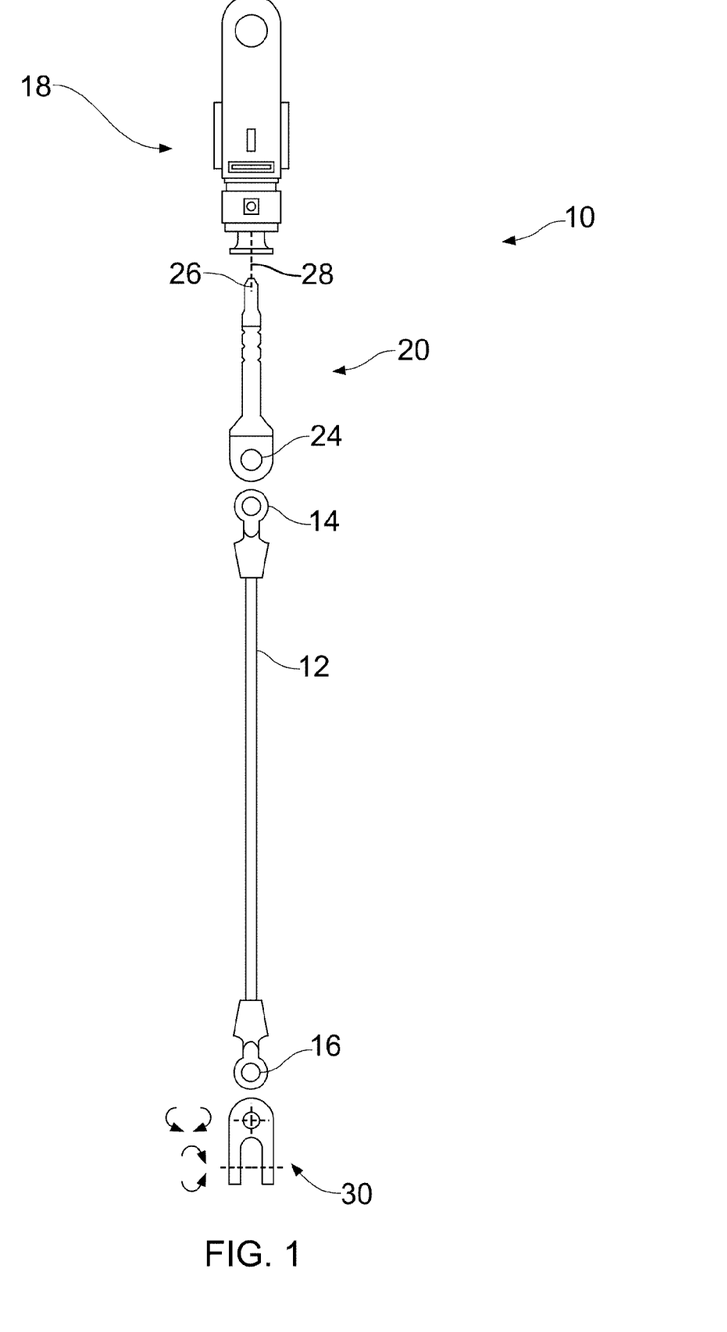
FIG. 1 is an exploded view of a pull through connector assembly comprising an embodiment of platform mooring connector in accordance with the present invention.
Figure 2:
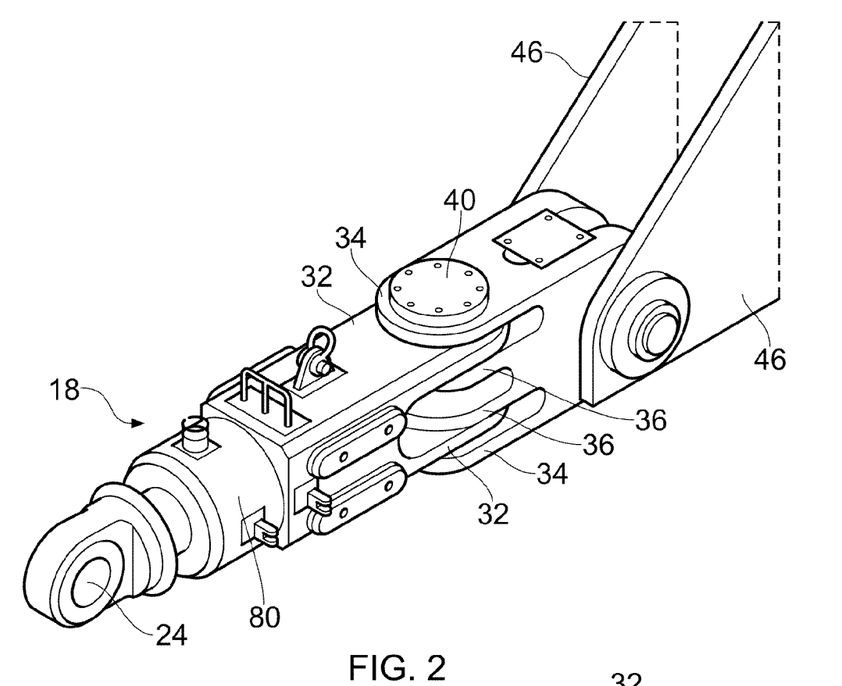
FIG. 2 is a perspective view of the platform mooring connector of FIG. 1, shown with a mandrel secured in the connector.

FIG. 1 shows a pull through connector assembly 10 in which a mooring line 12 having connecting eyes 14, 16 at each end can be releasably secured to a platform mooring connector 18 in accordance with the present invention. The connecting eye 14 at the upper end of the mooring line 12 is connected to a mandrel 20 by means of a securing pin (not shown) passing through a securing eye 24 at the lower end of the mandrel 20. The upper end of the mandrel 20 is provided with a securing eye 26 to which a winch wire 28 is attached, in use. The connecting eye 16 at the lower end of the mooring line 12 is connected to a bottom tendon 30 in the form of a conventional twisted Y-link which allows pivoting around two orthogonal axes, and which is secured to equipment (not shown) to be moored.

The platform mooring connector 18 and the mandrel 20 are shown in more detail in FIGS. 2 to 6.

Figure 5:
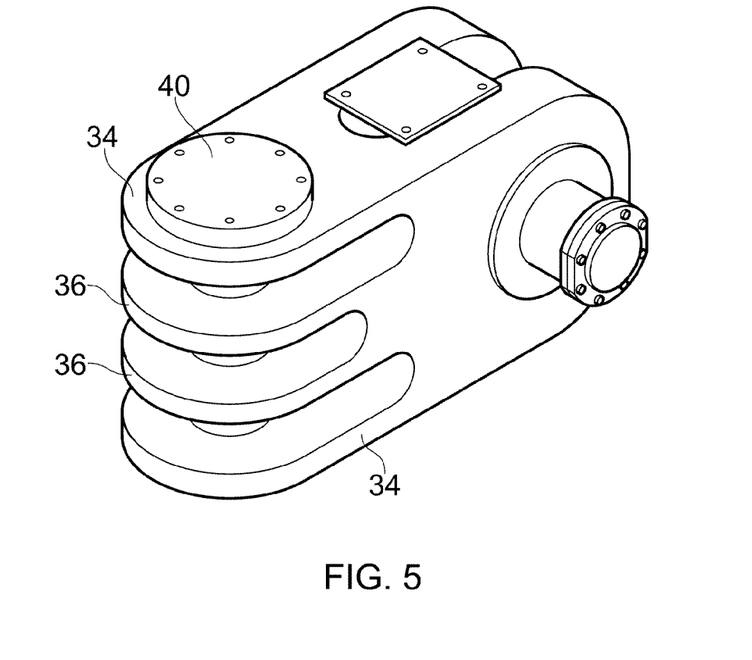
FIG. 5 is a perspective view of an upper end connection forming part of the platform mooring connector of FIG. 1.

The upper end of the platform mooring connector 18 is formed into two identical parallel longitudinally extending planar flanges 32, each of which is positioned between a respective identical pair of parallel flanges 34, 36 of an upper end connector 38 and is pivotally connected thereto by means of two securing pins 40, each passing through a respective pair of aligned apertures 42, 44 in the flanges 32, 36. The upper end of the connector is in turn pivotally connected between securing flanges 46 which, in use, would be secured (e.g. by welding) to a platform structure.

As best seen in FIGS. 2, 3, 6 and 7, the platform mooring connector 18 comprises an elongate, generally cylindrical, body 50 having a longitudinally extending through aperture 52 aligned with its longitudinal axis A-A. The aperture 52 comprises a main cylindrical aperture portion 54 of circular cross section which terminates at its upper end in a shoulder 56 and a lower portion 58 of slightly greater internal diameter. A radially outer sleeve 60 has main and lower outer surface portions 60a, 60b corresponding to the inner diameters of the main and lower portions 54, 58 respectively of the aperture 52 and an inner cylindrical surface 62 of constant diameter. The inner cylindrical surface 62 of the outer ring is provided with three longitudinally spaced rows of twelve identical, equally angularly spaced recesses 64 having a ramped surface 66 which is inclined to the longitudinal axis A-A. A metal ball 68 is located in each recess 64 and is configured to be able to project partially (but not completely) through an associated aperture in a cylindrical inner sleeve 70 which can be displaced in a direction parallel to the longitudinal axis A-A, as will be explained.

The inner sleeve 70 has an outer diameter which corresponds to the inner diameter of the inner surface 62 of the outer sleeve 60 and is slidably mounted in the outer sleeve 60. The inner sleeve is biased downwardly (leftwards as shown in FIGS. 2 to 6) by means of twelve identical compression springs 72 extending between the lower end of the outer sleeve 60 and a radially extending flange 74 at the lowermost end (the left end as seen in FIGS. 2 to 6) of the inner sleeve 70. The flange 74 is configured to engage with, and abut, a circumferential shoulder 21 on the mandrel 20 located approximately three-quarters of the way along the mandrel from the securing eye 26 at the upper end of the mandrel towards the securing eye 24 at the lower end of the mandrel. The inner sleeve 70 is connected to, and moves with, end cap 76 which has an outwardly flared bell mouth 78 for guiding the mandrel 20 into the connector 18.

The inner sleeve 70 and the end cap 76 (including the bell mouth 78) are also connected to, and move with, an external sleeve 80 which is slidably mounted on the exterior of the body 50 of the connector. The external sleeve 80 may be displaced, if necessary, by means of a remotely operated vehicle (ROV) or a diver, but that will normally only be necessary if the device becomes seized, as will be explained.

Figure 6:
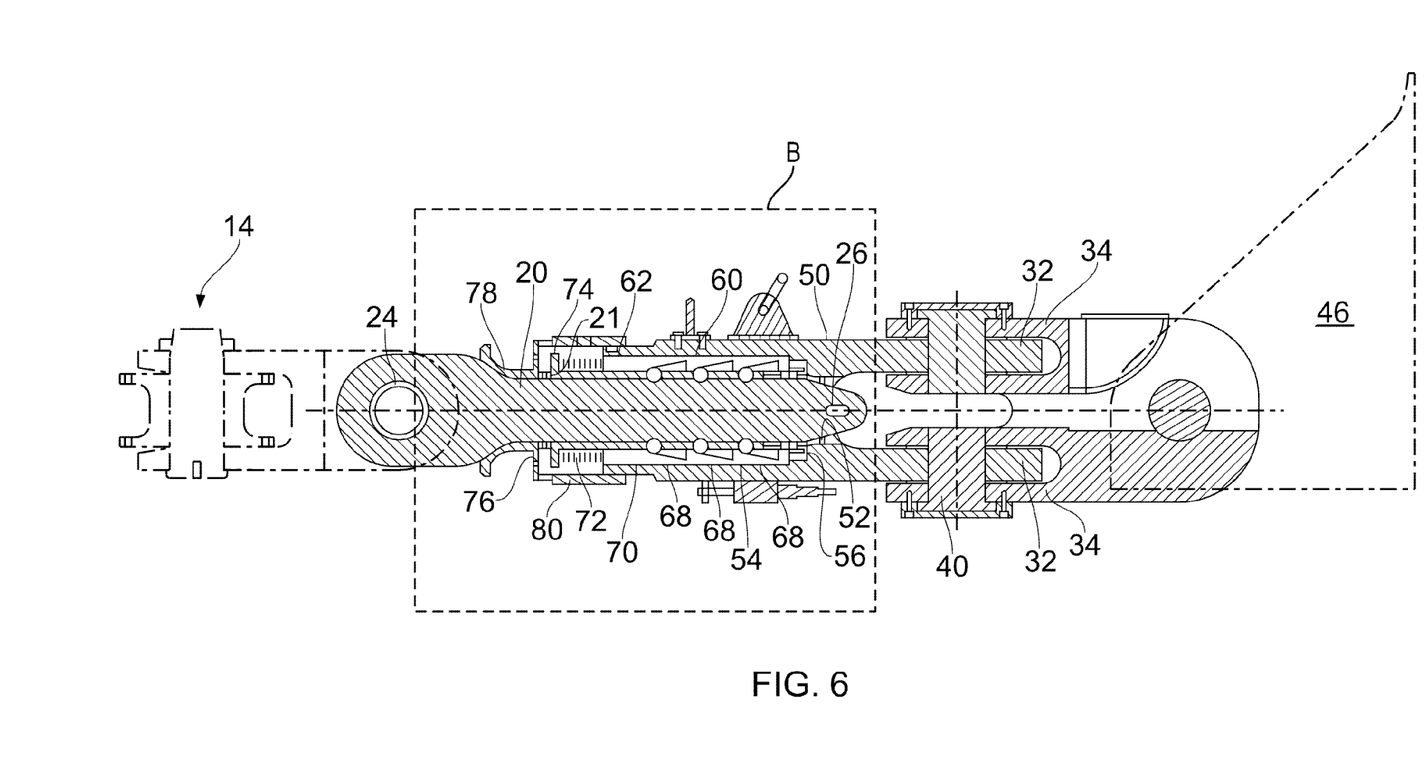
FIG. 6 is a vertical cross-section through the platform mooring connector of FIG. 1.
Figure 7:
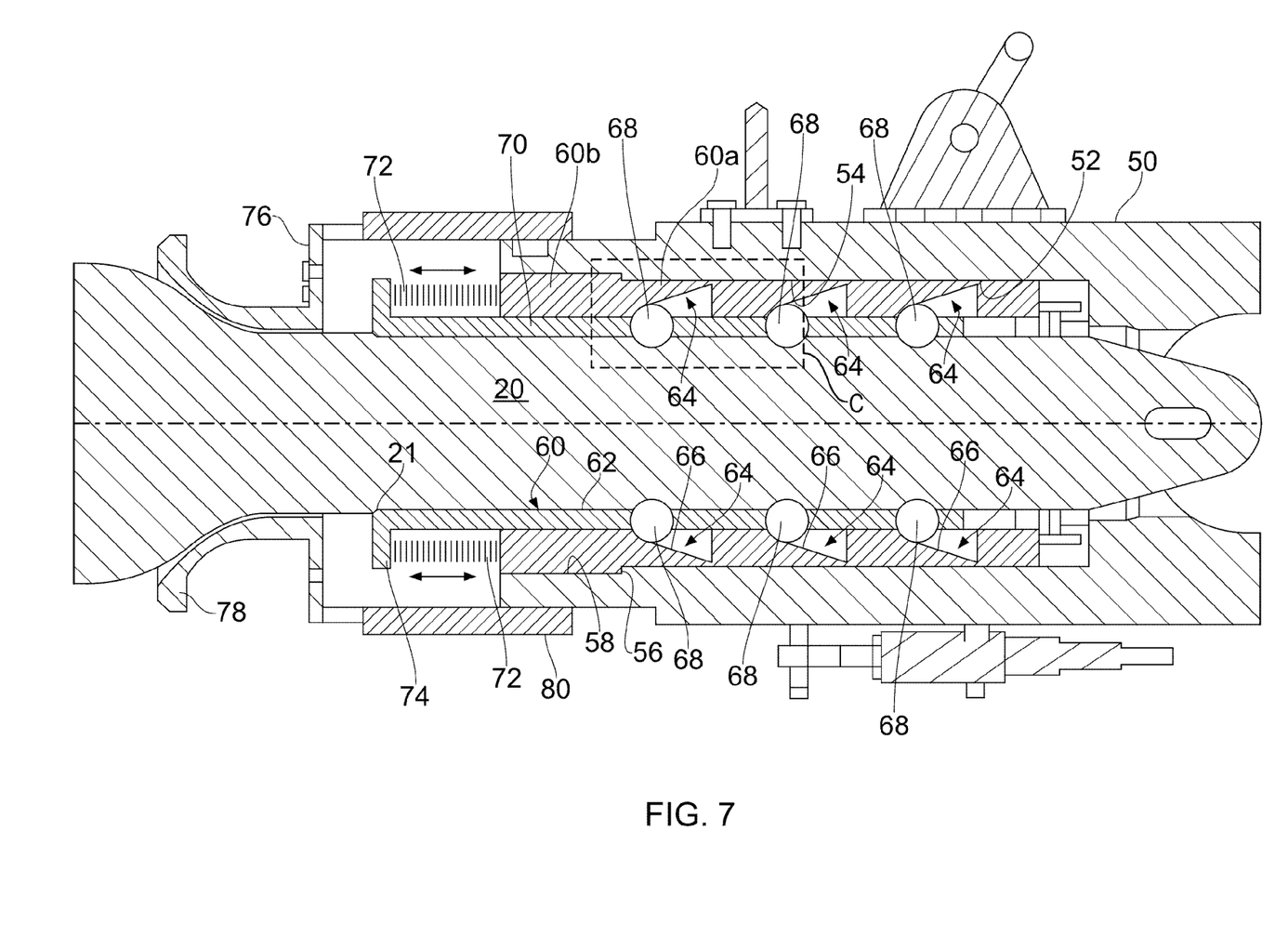
FIG. 7 is a view of the portion identified at B in FIG. 6, to a larger scale.

In its rest state, the inner sleeve 70 is biased towards the position shown in FIG. 6 towards the end cap 76 by means of the compression springs 72, which in turn displaces the balls 68 along the inclined surfaces 66 such that the balls 68 project partially through their corresponding apertures in the inner sleeve 70 and into the longitudinal aperture 52.

Figure 4:
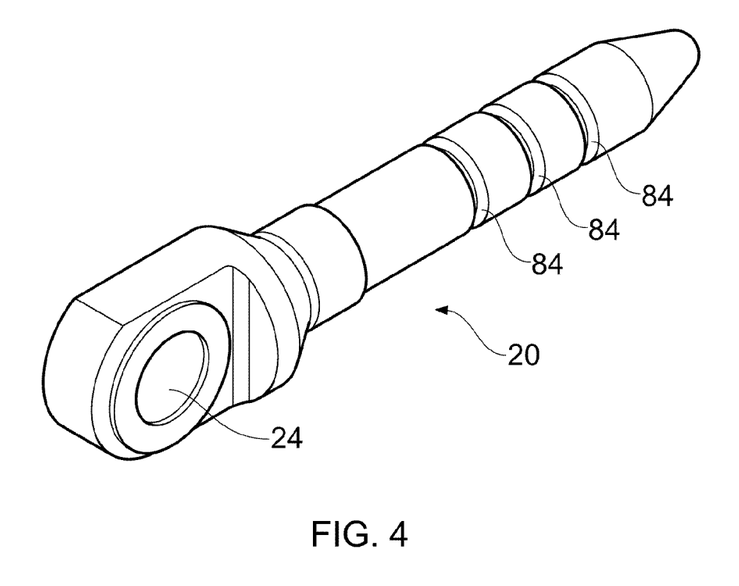
FIG. 4 is a perspective view of the mandrel shown in FIG. 2.

The mandrel 20 is generally elongate and cylindrical and, as explained previously, is provided with securing eyes 24, 26 at its lower and upper ends. The cylindrical portion of the mandrel is also provided with three identical circumferential peripheral grooves 84 in addition to the shoulder 21 as previously described. The spacing of the grooves 84 is identical to the spacing of the apertures in the inner sleeve 70 (and therefore the spacing of the balls 68) and the profile of the grooves matches that of the inwardly projecting portions of the balls 68, whereby the balls 68 and grooves 84 are configured to be a close complementary fit with each other.

In use, a winch wire 28 is connected to the securing eye 26 at the upper end of the mandrel 20. The winch wire is passed through the platform mooring connector 18 and is winched inwardly using a conventional winch (not shown). Continued winching causes the mandrel to be drawn into the interior of the platform mooring connector 18, which is assisted by means of the bell mouth 78 at the lower end of the connector 18.

Figure 8:
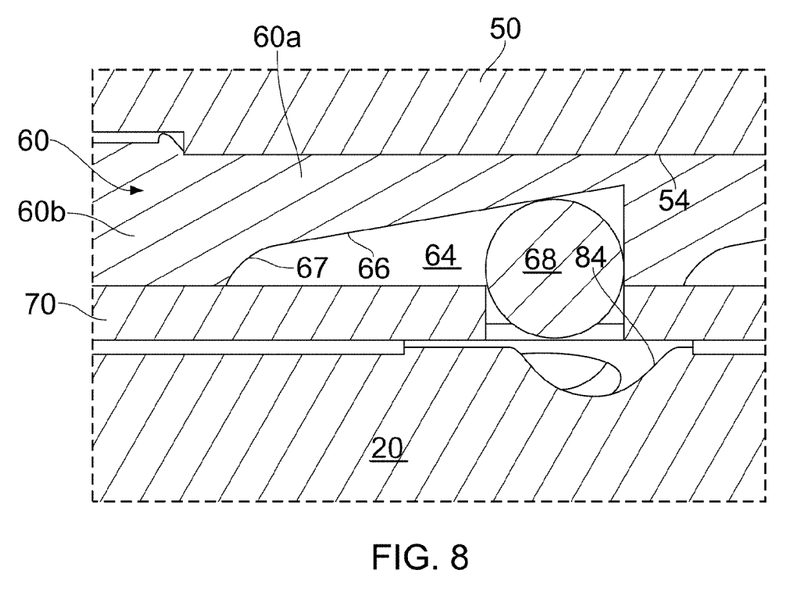
FIGS. 8 and 9 are views of the portion identified at C in FIG. 7, to a larger scale, shown in an unsecured and a secured condition respectively.

As the mandrel 20 continues to be drawn into the platform mooring connector 18, it passes the three rows of balls 68 in turn, but engagement of the balls by the mandrel causes the balls 68 to travel upwardly and radially outwardly along the inclined surfaces 66 of their respective recesses 64, as shown in FIG. 8, which is accommodated by the longitudinal movement of the inner sleeve 70 against the restoring force of springs 72.

Figure 9:
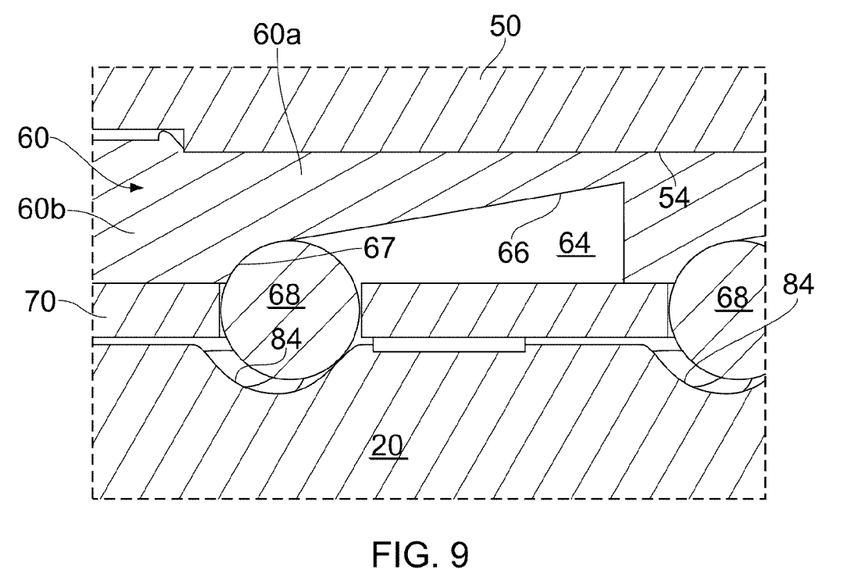

Eventually, the shoulder 21 of the mandrel 20 engages the radially extending flange 74 of the inner sleeve 70 such that any further upward movement (movement from left to right in the Figures) of the mandrel also causes the same longitudinal movement of the inner sleeve 70 (and of the end cap 76, bell mouth 78 and outer sleeve 82 which the inner sleeve 70 is connected), thereby compressing the spring is 72, which apply a restoring force in the opposite (downward) direction. In this position, the three rows of balls 68 are aligned with the respective grooves 84 in the mandrel and the balls 68 thereby become seated in their respective grooves 84, as shown in FIG. 9, thereby preventing longitudinal displacement of the mandrel with respect to the inner sleeve and securing the mandrel within the connector assembly 10. If the tension in the winch wire 28 is released, the springs 72 displace the inner sleeve 70 downwards (to the left in FIGS. 7 and 8) so that the balls 68 are engaged with the radially inner ends 67 of their recesses 64.

It will be observed from FIGS. 8 and 9 that the lower, radially inner, end 67 of the recesses 64 are formed into a part-spherical shape, complementarily shaped to the shape and size of the balls 68, to provide a secure seating for each of the balls and to help retain the engagement of the balls with the outer sleeve 60. The downward force on the mandrel (in the direction from right to left in the Figures) due to the weight of, and tension in, the mooring line 12 serves to increase the engagement of the balls in the part-spherical inner ends 67 of the recesses 64.

Figure 3:
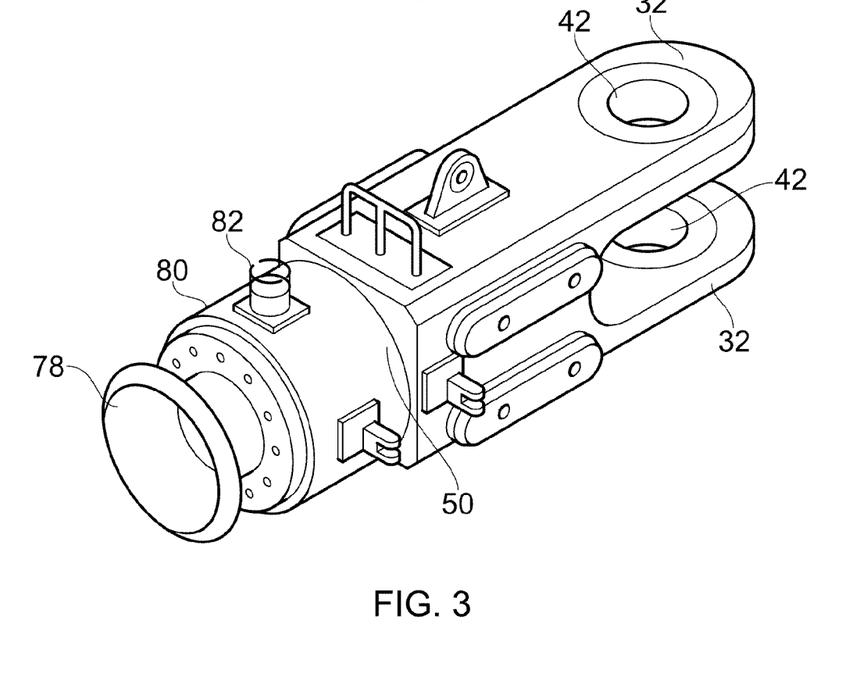
FIG. 3 is a perspective view of the platform mooring connector of FIG. 1, shown with the mandrel removed.

If it is desired to disengage the mandrel from the platform mooring connector 18, an upward force is applied to the mandrel at the upper securing eye 26, against the tension in the mooring line 12. In view of the engagement of the circumferential shoulder of the mandrel 21 with the radial flange 74 of the inner sleeve 70, the mandrel 20 and inner sleeve 70 (and the end cap 76, bell mouth 78 and outer sleeve 82 which the inner sleeve 70 is connected) are therefore displaced longitudinally together. This allows the balls 68 to move radially outwardly, along the inclined surfaces 66 of the recesses 64, thereby disengaging the balls 68 from the grooves 84 in the mandrel. When the balls 68 are disengaged, a lock pin can be fitted by means of a ROV or a diver to a fitting 82 on the external sleeve 80 (FIG. 3). This locks the balls 68 in the retracted position, allowing the mandrel 20 to be lowered out in a controlled manner By releasing the upward force on the mandrel, the balls 68 can be completely disengaged from the recesses 84 in the mandrel 20, allowing the mandrel 20 to be pulled downwardly (from right to left in the Figures) as a result of the tension in the mooring line 12. The mandrel is thereby disengaged from the platform mooring connector and can be withdrawn from it.

If the above-described disengagement procedure does not work (for example, if the assembly becomes seized, which may occur after a prolonged period on the water) the disengagement may be achieved by displacing the external sleeve 80 downwardly (to the left as shown in FIGS. 6 to 9) by means of a ROV or a diver. As the inner sleeve 70 is connected to the outer sleeve 80, displacement of the outer sleeve 80 will also result in displacement of the inner sleeve 70 and disengagement of the balls 68.

The invention is not restricted to the details of the foregoing embodiment.

For example, the number of balls 68 (and associated recesses 64) and/or the number of springs 72 may differ from those illustrated and described, depending on the load requirements.

What is claimed is:

1. A mounting device for an elongate member, comprising:
    an elongate housing having an elongate axis;
    an internal passageway passing through the elongate housing parallel to the elongate axis;
    an elongate sleeve located within the internal passageway and being configured for longitudinal movement along the passageway;
    a plurality of ball-receiving recesses in the wall of the internal passageway, each recess having a ball-guiding surface inclined to the longitudinal axis;
    a plurality of apertures in the sleeve;
    a ball located in each of the ball-receiving recesses and engaged with a respective aperture in the sleeve, the balls and the apertures being configured to allow the balls to project partially through the apertures but to prevent balls from passing through;
    biasing means configured to bias the sleeve in a direction to urge the balls to project radially inwardly through their respective apertures in the sleeve and into the internal passageway; and
    guide means for guiding a mandrel into the internal passageway, wherein the guide means is connected to, and moves with, the sleeve.

2. A mounting device as claimed in claim 1, comprising a plurality of longitudinally-spaced rows of ball-receiving recesses, each recess having a ball-guiding surface inclined to the longitudinal axis and a ball located in each of the ball-receiving recesses, and wherein the sleeve comprises a plurality of longitudinally-spaced rows of ball-receiving apertures corresponding to the balls.

3. A mounting device as claimed in claim 1, comprising spring means configured to bias the sleeve in a direction to urge the balls to project radially inwardly through their respective apertures in the sleeve.

4. A mounting device as claimed in claim 1, wherein the elongate sleeve is connected to and moves with an external sleeve which is displaceable from the exterior of the housing.

5. A mounting device as claimed in claim 4, wherein the external sleeve is displaceably mounted on the exterior of the housing and connected to the elongate sleeve located within the internal passageway.

6. A mounting device as claimed in claim 1, comprising one or more mounting points at an end of the housing for connecting to an upper end of a platform mooring connector.

7. A mounting device as claimed in claim 6, wherein the mounting points comprise flanges.

8. A mounting device as claimed in claim 1, wherein the housing comprises an outer sleeve portion through which the internal passageway passes, the movable elongate sleeve being slidably mounted within the outer sleeve.

9. A mounting device as claimed in claim 1, comprising a bell mouth at one end of the elongate housing.

10. A mounting assembly comprising:
  a mounting device for an elongate member, comprising:
    an elongate housing having an elongate axis;
    an internal passageway passing through the elongate housing parallel to the elongate axis;
    an elongate sleeve located within the internal passageway and being configured for longitudinal movement along the passageway;
    a plurality of ball-receiving recesses in the wall of the internal passageway, each recess having a ball-guiding surface inclined to the longitudinal axis;
    a plurality of apertures in the sleeve;
    a ball located in each of the ball-receiving recesses and engaged with a respective aperture in the sleeve, the balls and the apertures being configured to allow the balls to project partially through the apertures but to prevent balls from passing through;
    biasing means configured to bias the sleeve in a direction to urge the balls to project radially inwardly through their respective apertures in the sleeve and into the internal passageway;
    guide means for guiding a mandrel into the internal passageway, wherein the guide means is connected to, and moves with, the sleeve; and
  a mandrel, the mandrel having a peripheral recess configured to receive a plurality of balls of the mounting device.

11. A mounting assembly as claimed in claim 10, wherein the mandrel has a plurality of peripheral recesses configured to receive a plurality of balls of the mounting device.

12. A mounting assembly as claimed in claim 11, wherein the number of peripheral recesses in the mandrel corresponds to the number of rows of balls of the mounting device.

13. A mounting assembly as claimed in claim 10, wherein the mandrel comprises a radially projecting portion configured to abut a portion of the elongate sleeve when the balls are located in the peripheral recess or recesses of the mandrel.

14. A mounting assembly as claimed in claim 13, wherein the radially projecting portion of the mandrel comprises a shoulder.

15. A mounting assembly as claimed in claim 14, wherein the shoulder extends circumferentially around the mandrel.

16. A mounting assembly as claimed in claim 10, wherein the ball-receiving recesses comprise a rounded portion at one end configured to receive a respective one of the balls.

17. A mounting assembly as claimed in claim 16, wherein the rounded portions of the recesses are complementarily shaped and sized with the respective balls.

* * * * *